United States Patent [19]
Burken et al.

[11] Patent Number: 6,041,273
[45] Date of Patent: Mar. 21, 2000

[54] EMERGENCY CONTROL AIRCRAFT SYSTEM USING THRUST MODULATION

[75] Inventors: John J. Burken, Tehachapi; Frank W. Burcham, Jr., Lancaster, both of Calif.

[73] Assignee: The United States of America as represented by the Administrator of the National Aeronautics and Space Administration, Washington, D.C.

[21] Appl. No.: 08/886,656

[22] Filed: Jul. 1, 1997

[51] Int. Cl.[7] .................................................. B64C 19/00
[52] U.S. Cl. ............................. 701/3; 701/120; 701/121; 244/12.4; 244/12.5; 244/51; 244/75 R
[58] Field of Search ............................... 701/3, 120, 121; 244/51, 75 R, 181, 188, 12.3, 12.4, 12.5

[56] References Cited

U.S. PATENT DOCUMENTS

| | | | |
|---|---|---|---|
| 3,096,050 | 7/1963 | Snowdon | 244/77 |
| 3,591,110 | 7/1971 | Dramer et al. | 244/77 D |
| 3,618,878 | 11/1971 | Klein et al. | 244/77 D |
| 3,627,238 | 12/1971 | Menn | 244/77 D |
| 3,665,465 | 5/1972 | Miller | 343/7 ED |
| 3,908,934 | 9/1975 | Schloeman | 244/77 D |
| 4,357,663 | 11/1982 | Robbins et al. | 364/433 |
| 4,471,439 | 9/1984 | Robbins et al. | 364/433 |
| 4,536,843 | 8/1985 | Lambregts | 364/434 |
| 4,764,872 | 8/1988 | Miller | 364/433 |
| 5,330,131 | 7/1994 | Burcham et al. | 244/75 R |
| 5,337,982 | 8/1994 | Sherry | 244/186 |

FOREIGN PATENT DOCUMENTS 3635899  10/1986  Germany.

*Primary Examiner*—William A. Cuchlinski, Jr.
*Assistant Examiner*—Yonel Beaulieu
*Attorney, Agent, or Firm*—John H. Kusmiss

[57] ABSTRACT

A digital longitudinal Aircraft Propulsion Control (APC) system of a multiengine aircraft is provided by engine thrust modulation in response to comparing an input flightpath angle signal $\gamma c$ from a pilot thumbwheel or an ILS system with a sensed flightpath angle $\gamma$ to produce an error signal $\gamma e$ that is then integrated (with reasonable limits) to generate a drift correction signal to be added to the error signal $\gamma e$ after first subtracting a lowpass filtered velocity signal $\text{Vel}_f$ for phugoid damping. The output error signal is multiplied by a constant to produce an aircraft thrust control signal ATC of suitable amplitude to drive a throttle servo for all engines, each of which includes its own full-authority digital engine control (FADEC) computer. An alternative APC system omits sensed flightpath angle feedback and instead controls the flightpath angle by feedback of the lowpass filtered velocity signal $\text{Vel}_f$ which also inherently provides phugoid damping. The feature of drift compensation is retained.

9 Claims, 2 Drawing Sheets

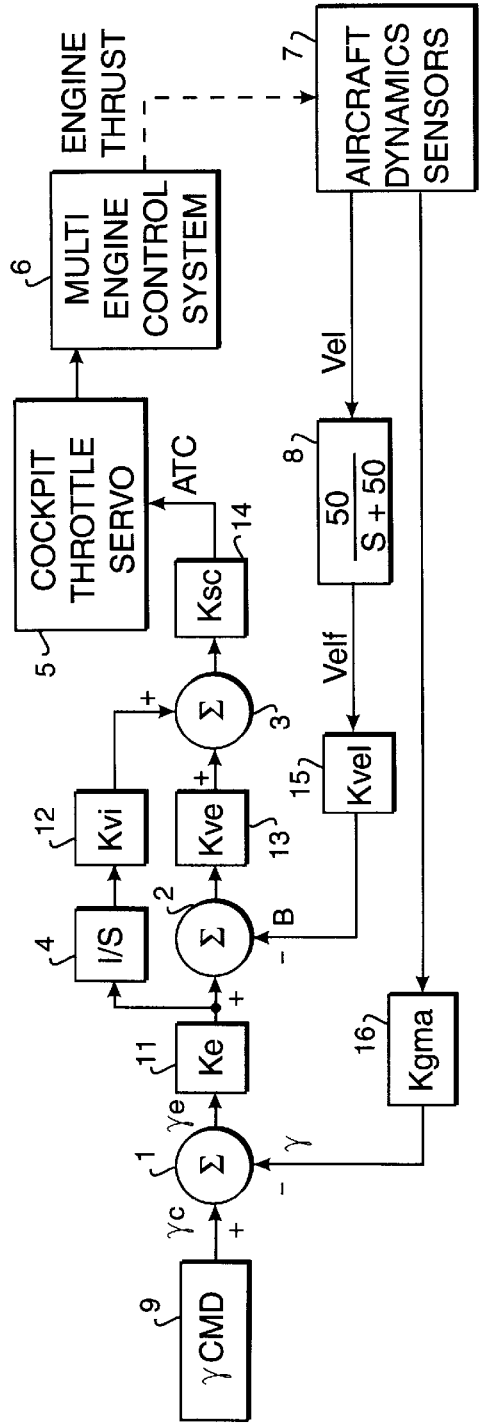
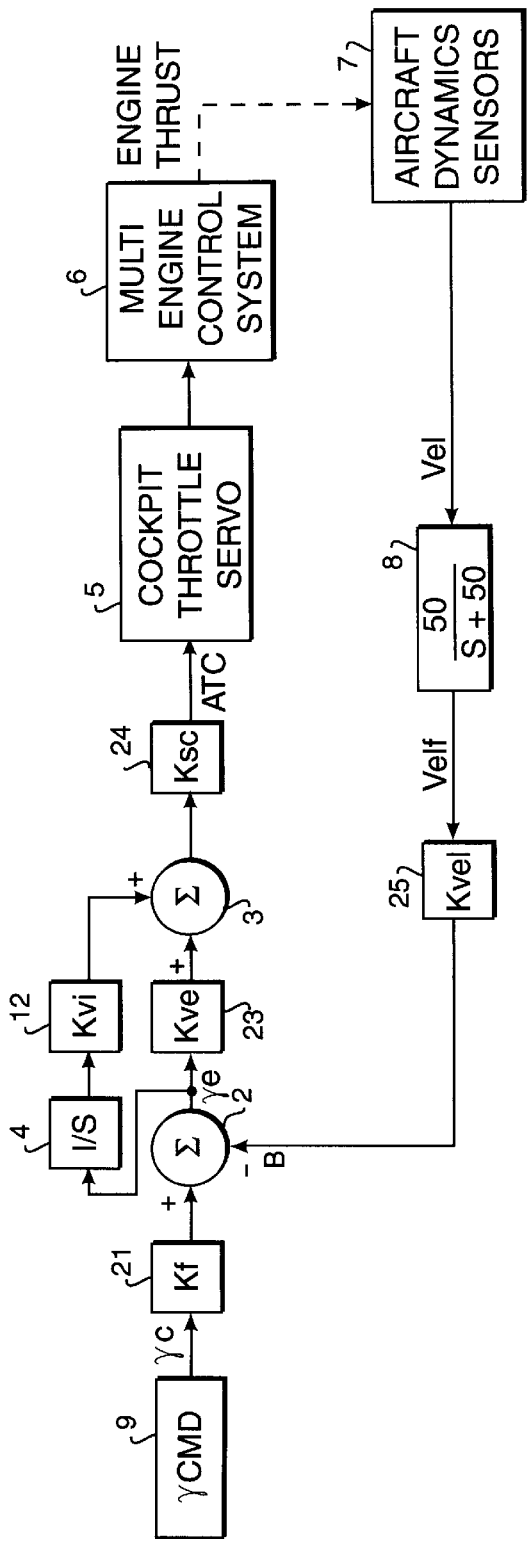
FIG. 1
FIG. 2

EMERGENCY CONTROL AIRCRAFT SYSTEM USING THRUST MODULATION

ORIGIN OF INVENTION

The invention disclosed herein was made by employees of the United States Government and may be manufactured and used by or for the Government for governmental purposes without the payment of any royalties therefor.

TECHNICAL FIELD

The invention relates to an emergency control aircraft system that uses autothrottle thrust modulation for control of an aircraft in the event of a primary flight control system failure.

BACKGROUND ART

Aircraft flight control systems are designed with extensive redundancy to ensure a low probability of failure. During recent years, however, several airplanes have experienced a major flight control system failure leaving engine thrust as the only mode of flight control. In some of these emergency situations, engine thrust was modulated by the pilot to maintain control only of the flightpath angle γ, but in other situations lateral control was also required. In the majority of the cases surveyed, crashes resulted and over 1,200 people died.

Thus, the challenge was to create a sufficient degree of thrust modulation control by the Flight Control Computer (FCC) to safely fly and land an airplane using an Instrument Landing System (ILS). Meeting this challenge was the objective of a program to develop a Propulsion-Controlled Aircraft (PCA) emergency backup system. The proposed PCA system required that the aircraft have at least two engines, one on each wing, and that the normal control surfaces not be locked in a hardover position which could exceed the moments that could be created from the controlled thrust of the engines.

The results of analytical studies and flight tests show that control can be obtained by autocontrol of the engine throttles through the FCC. However, making a safe runway landing is exceedingly difficult because of low phugoid damping and high pilot work load near the ground. The problem has been to not only improve emergency control performance but also reduce pilot work load using a PCA system. The end goal was to make landing as well as climbing, cruising at altitude, and descending a viable task by using the PCA system with minimal or no previous pilot training required.

In the recent past, a propulsion controlled system has been developed and disclosed in U.S. Pat. No. 5,330,131 by Frank W. Burcham et al. (incorporated herein by this reference) based upon a program modification of an otherwise normal FCC that, in the event of a failure of the normal flight control system of a multiengine airplane, substitutes normal pitch axis control with symmetric control of the engines through their FCC driven servos using pitch attitude and pitch rate sensed by gyros to provide the feedback signals necessary to track a pitch command signal. That patented flight control system requires modification not only of the FCC but also of each full-authority digital engine control (FADEC) computer for each engine. An objective of this invention is to provide a longitudinal emergency backup system for a PCA that requires only program modification of the FCC without any changes in the separate FADEC computers of the engines based upon tracking a flightpath angle command (γc) from a pilot thumbwheel, an Instrument Landing System (ILS), or the like, using a feedback signal from a flightpath angle sensor, or its reasonably equivalent altitude if there is not available on the aircraft a flightpath angle signal source aided by a feedback signal from a velocity sensor or, in a less complex method with some loss in performance, using only the sensed velocity signal.

STATEMENT OF THE INVENTION

In accordance with the present invention, longitudinal control of a multiengine aircraft is provided in response to a flightpath angle command, γc, produced by a pilot-operated thumbwheel, instrument landing system, or the like, and compared to a sensed flightpath angle, γ, scaled by a constant, Kgma, to render the feedback signal proportional to the command signal. The comparison produces an error signal, γe, which is in turn scaled by a constant Ke before subtracting a sensed velocity signal, Vel, after lowpass filtering and scaling it by a constant Kvel to render the velocity feedback signal proportional to the scaled flightpath error signal. This subtraction of the scaled and lowpass filtered velocity feedback signal produces a phugoid-damped γ error signal. The undamped γ error signal is integrated and scaled by a constant Kvi to produce a drift correction signal for addition to the phugoid damped error signal, which after scaling by a constant Kve, produces an engine servo control signal that is then used to control the engine through a cockpit throttle servo that is part of a flight control computer. All of these functions involved in producing a servo control signal from the flightpath angle command and the feedback signals (γ and Vel) are programmed into a cockpit flight control computer, including the scaling of the servo control signal in order for it to be compatible with the servo requirements. Typically there is but one throttle servo controlling all engines of a multiengine airplane, but in the event there is a separate servo for each engine, the same control signal is applied to each servo.

For a less complex longitudinal control system, only the velocity feedback signal is used for comparison with the flightpath angle command, γc. In this case, the command signal is scaled by a constant Kf for it to be proportional to the lowpass filtered signal Vel scaled by the constant Kvel. The error signal produced by this comparison is thus a phugoid damped flightpath angle error signal. That error signal is then integrated and scaled by the constant Kvi for addition to the phugoid damped error signal for drift correction. This single velocity feedback correction will provide for flightpath angle control because, as the actual aircraft flightpath angle increases or decreases from the commanded angle, the aircraft velocity will decrease or increase, respectively. Correction may be slower with only this velocity feedback, but it does have the redeeming feature of providing phugoid damping.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a functional block diagram of a PCA system which is the subject of the present invention to be implemented by programming the system into the FCC of the aircraft using both sensed flightpath angle, γ, and sensed velocity, Vel, feedback signals.

FIG. 2 is a functional block diagram of a modified PCA system using only the feedback signal Vel from a velocity sensor.

DETAILED DESCRIPTION OF THE INVENTION

Figure 3A:
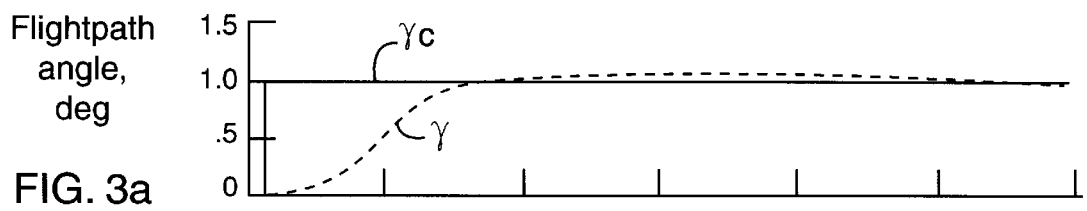
FIGS. 3A–3E present a time history of a PCA control of flightpath angle, γ, in response to a step change in the commanded flightpath angle, γc, and recorded dynamic changes in velocity, pitch attitude rate, engine thrust, and altitude.

The test vehicle for the invention to be described in detail was the MD-11 wide-body transport which has a mechanical flight control system with hydraulically powered actuators. The MD-11 airplane is equipped with a Flight Control Computer (FCC) which provides a Flight Management System (FMS) that integrates autopilot, navigation, and autoland functions. The autopilot control includes a thumbwheel for commanding flightpath angle, $\gamma_{cmd}$ during all phases of flight, namely climbing, cruising and descending.

The hydraulic power for control of all aircraft flight effectors is provided by three independent systems, each designed for fail-safe capability, i.e., for not failing in a hardover position. Essential flight control functions may be maintained by any one of these three independent systems. Pitch control is provided by dual elevators, one on each horizontal stabilizer, and pitch trim is provided by a movable horizontal stabilizer. Inboard and outboard ailerons supplemented by wing spoilers provide roll control. A dual rudder mounted on a single vertical stabilizer provides yaw control. Flaps are extended rearwardly and downwardly to increase wing resistance when required. Lateral dynamics of the aircraft is controlled by a yaw damper integrated as part of the FMS, and longitudinal stability augmentation is provided by the FMS through pitch dynamics. All of the lateral and pitch dynamic surfaces are controlled by hydraulic actuators.

The three engines that power the MD-11 aircraft are Pratt & Whitney (PW4460) high-pass ratio turbofan jet engines in the 60,000 lb. thrust class. Two of the engines are mounted in underwing pods below the center of gravity (c.g.) of the aircraft, one on each wing, and the third engine is located at the base of the vertical stabilizer above the c.g. The wing engines are 121 inches below the nominal c.g., and the tail engine is 240 inches above the nominal c.g. with its thrust axis inclined 2.5° down (nozzle pointing down). Each engine is provided with its own Full-Authority Digital Engine Control (FADEC) computer driven by the FCC.

As is typical for high-bypass turbofans, thrust response is initially very slow. Once thrust levels are above 20%, the engine response improves dramatically. An "approach idle" setting (when the flaps are extended beyond 27°) maintains the idle revolutions per minute (RPM) at a sufficiently high level that 8 second response from idle to full-power requirement can be met. A "cruise idle" or "minimum idle" setting can require as much as 12 seconds to go from idle to full power. If the PCA were engaged with "minimum idle," a pilot-induced oscillation (PIO) could occur because of large time lags. For this reason, the FCC is programmed to set the FADEC system to "approach idle" when the emergency PCA is engaged by the pilot once a failure of the normal flight control occurs.

Pitch effects occur because of thrust changes in the wing engines located below the c.g. and slightly tilted up. This arrangement is typical of the majority of wing-engine aircraft. Assuming that the aircraft were initially trimmed in level flight, an increase in thrust would cause a change in flightpath angle caused by the vertical component of thrust, a moment resulting from the horizontal thrust component because of the c.g. offset, and a trim speed stability change. If an engine were mounted above the c.g., as is the case with the MD-11 tail engine, an increase in thrust would cause the pitch down moment until the trim speed overcomes the nosedown dynamics. Other effects, such as ram drag and engine inlet location, are other important considerations in the aircraft dynamics.

PCA Control System Design

All large civil transports have at least two engines; therefore, the design philosophy was to make the PCA longitudinal control program for the MD-11 generally applicable not only to work primarily with the two wing engines but also to include the third engine as though it were an additional pair of wing engines so that if a civil transport has more engines, the aircraft could take advantage of this PCA control system. If all the aircraft engines do not lie on the same horizontal plane, pitching moment and velocity (Vel) changes can be compensated independently. The MD-11 test aircraft falls into this category since it has a center engine above the c.g. the thrust of which can be used directly for trim speed and dynamic control of flightpath angle. Lateral control may be effected by differential control of the two wing engines while longitudinal control is taking place, but the present invention relates only to the problem of longitudinal propulsion control.

The longitudinal control laws developed assume not only that the normal control surfaces are not functioning but also are not in a hardover position. The PCA uses engine thrust modulation of all three engines driven by a closed-loop controller programmed into FCC of the PCA to increase bare airframe phugoid damping and thus allow the pilot to land safely by controlling flightpath angle γ.

Symmetric or collective throttle inputs are used for longitudinal control. Symmetrical thrust changes cause an initial change not only in velocity but also in pitch and pitch rate, depending on the relative location of the thrust line and the aircraft center of gravity at the moment of thrust change. It would therefore be desirable to monitor pitch and pitch rate and to so integrate them into the autothrottle control command (ATC) so as to minimize phugoid oscillations. However, the present invention integrates only sensed velocity in the longitudinal control laws that produces the ATC.

Classical methods were initially used to provide a linear design of longitudinal control using simulators with reasonable first cut results. Later in the flight-test phase, nonlinear time domain methods were employed for rapid setting of sealing constants. The nonlinear simulators were also used to adjust the initial scaling constants determined from the linear design. The PCA system was designed with the flexibility to change the control gain in flight by using an existing Multifunction Control and Display Unit (MCDU) that provides the pilot with "dial-a-gain" options for the PCA.

Pilot Vehicle Interface

The Flight Control Panel (FCP) is used for the pilot to set the flight path angle γc for the PCA control. A flightpath angle error signal is produced by subtracting sensed flightpath angle and also subtracting from the error aircraft velocity in the FCC for phugoid oscillation damping. The pilot could also engage the Instrument Landing System (ILS) and set the PCA-system with a preselected mode to control flightpath angle during an ILS approach by pushing an approach/land button on the FCP, but another mode of velocity feedback only (described below) could also be selected through the MCDU depending upon the maneuver the aircraft is engaged in at the time of normal major aircraft control failure. When any PCA selected mode is engaged, the "approach idle" engine setting is automatically set to achieve faster engine thrust response to PCA commands, thus avoiding any possible PCA induced oscillation.

Longitudinal Control of Flightpath Angle

Longitudinal control uses symmetric thrust commands simultaneously directed to all engines through a cockpit throttle servo to control the flightpath angle γ. Although the control law was developed primarily to control the flightpath angle for a landing approach, it may also be used to control the flightpath angle for up-and-away as well as level cruise control in response to flightpath angle and velocity commands entered in the cockpit by the pilot, the ILS, or other system.

Referring to FIG. 1, the functional block diagram for the control law in the S-plane to be described below comprises: three summing (Σ) functions 1, 2, and 3; an integrating (1/S) function 4; a cockpit throttle servo 5 that serves to control all three MD-11 engines via a multiengine control system 6; aircraft dynamics sensors 7; a lowpass filter 8; a flight path angle command γc source 9 which may be a pilot thumbwheel or an ILS system; and five scaling (proportioning) constants 11–15 that function like signal amplifiers set with constant gain values but actually implemented in a digital computer program as a multiplier. The feedback signals in the PCA system are sensed flightpath angle γ for tracking and air velocity Vel for phugoid damping. A flightpath angle error signal γe is produced by comparing the pilot input value γc with the feedback signal of sensed flightpath angle γ scaled by a constant Kgma and a velocity feedback signal Vel$_f$ is produced by lowpass filtering the sensed velocity signal Vel. Both the flightpath error signal γe and the filtered velocity signal Vel$_f$ are proportioned by separately and empirically determined constants Ke and Kvel. The proportioned flightpath error signal Ke*γe is compared to the proportioned velocity feedback signal Kvel*Vel$_f$, and the difference is scaled by a constant Kve to produce an error signal that is the difference between the two proportioned feedback signals. The proportioned error signal Ke*γe is processed through a limited integrator 4 to produce an integral of flightpath angle error which is added to the proportioned error signal to produce an aircraft throttle command signal that is multiplied by a scaling constant Ksc to meet the input signal amplitude requirements of the cockpit throttle servo 5.

The control law in the S-plane for maintaining a pilot commanded flight angle γ is as follows:

$$ATC=Ksc(Kvi/S *\gamma e*Ke+(\gamma e*Ke-B)Kve) \quad (1)$$

where: Ksc is a constant for proportioning the control output signal to the cockpit throttle servo;

γe=γc−γ, and γ is the sensed flightpath angle scaled by a constant Kgma to be proportional to the command input γc in volts per degree;

B=Kvel*Vel$_f$, and Vel$_f$ is sensed velocity Vel lowpass filtered in block 8;

Ke and Kve are scaling constants;

Kvi is a scaling constant for the integral γeKe/S; and

ATC is the engine thrust control output to throttle servo 5 that controls all engines.

The constant gains for the MD-11 are:
Kve=13.45
Kvi=0.952
Kvel=0.21

Kgma=1.03

The engine thrust control output command ATC is applied to the throttle servo 5 of all engines.

An alternative implementation of the control law defined by Equations (1) using only a velocity feedback signal Vel to control the flightpath angle γ is shown in FIG. 2. The sensed velocity Vel is processed as before, but with the constant Kvel equal to 0.15 instead of 0.21 and other constants are set differently. The control law in the S plane is as follows:

$$ATC=Ksc*\gamma e(Kvi/S+Kve) \quad (2)$$

where: γe=γc−B,

Ksc and B are as defined above for Equation (1); ATC= Kfγc—

The constant gains for this embodiment of the PCA are:
Kf=0.2×2.5
Ke=5
Ksc=1000
Kvel=0.15

Operation of the embodiment of FIG. 2 is the same as that of FIG. 1 except for the elimination of a γ-feedback and the different values for the constants Kf in place of Ke, as represented by the functional blocks 14 and 11, respectively, and the different values for the same constants Kvi, Kve, Ksc, and Kvel, as represented by the functional blocks 22, 23, 24, and 25 employed to scale the signal values in proportion with other values to reach the scale needed for the output signal ATC.

Figure 3B:
Figure 3C:
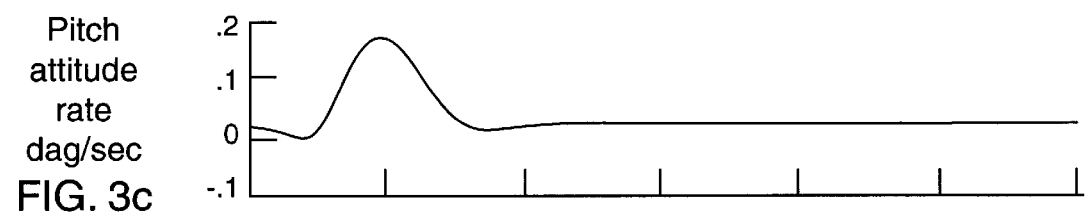
Figure 3D:
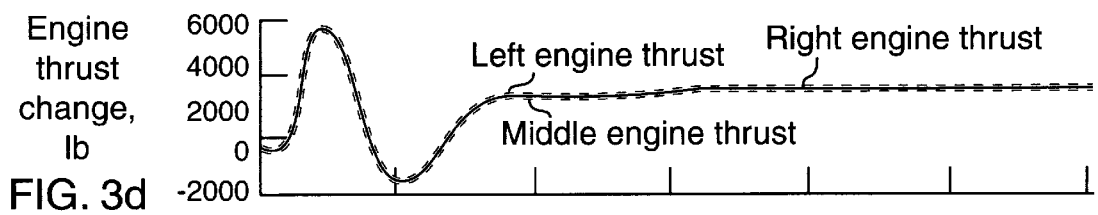
Figure 3E:
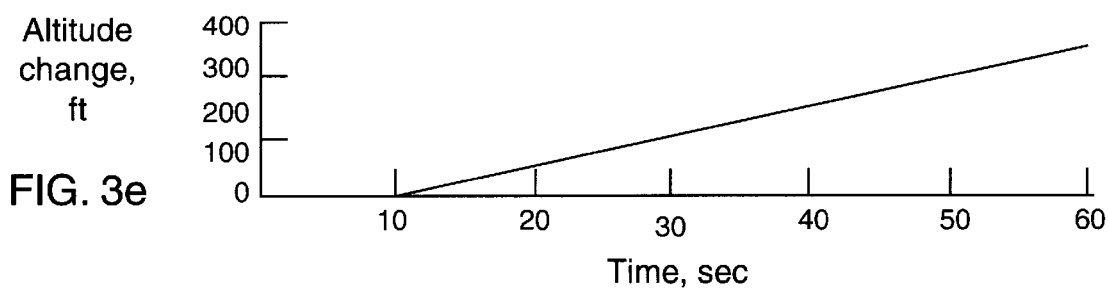

FIG. 3 shows a simulation time history of a PCA control of all three MD-11 aircraft engines in response to a 1° flightpath angle command using the control law of Equation (1). These data indicate that it took 20 seconds to reach the commanded input of 1°. This speed is slower than with only the wing engines, because the middle engine is producing a nosedown moment since it is above the c.g., while the wing engines below the c.g. are producing a nose-up moment. Velocity increased approximately 2.5 kn then settled back to almost the initial speed with a pitch attitude rate of 0.1 deg/sec. The change in thrust levels for the left and tail engines are presented for the simulation engine activity. The change in the altitude trace shows constant climb for the 1° flightpath angle command. This control law was not flight tested but is presented because of the very simple nature of the design and implementation. Based on linear simulation results, this control law could be used to safely land the airplane while the pilot manually provides differential throttle inputs for lateral/directional control in the absence of any other provisions.

Although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. An emergency control servo system for using thrust modulation for longitudinal control of a multiengine aircraft having a throttle servo for control of all engines in unison, comprising means for independently entering a flightpath angle command to be maintained and producing a flightpath angle command signal γc, means for continually sensing said aircraft flightpath angle and producing a flightpath angle signal γ, means for producing a flightpath error signal γe as a fiction of the difference between said flightpath angle command γc and said sensed aircraft flightpath angle γ, means for forming a limited integral as a function of said error signal and means for adding said integral to said error signal for producing an output control signal for said throttle servo, thereby to adjust thrust of said engines to reduce said error signal γe toward zero.

2. An emergency control servo system as defined in claim 1 wherein all of said means function to produce digital signals for digital operation of means receiving said digital signals.

3. An emergency control servo system as defined in claim 1 further comprising means for sensing aircraft longitudinal velocity to produce a velocity signal, means for lowpass filtering and scaling said velocity signal to produce a filtered signal and means for subtracting said filtered velocity signal from said flightpath error signal γe, thereby damping any phugoid oscillation of said flightpath error γe.

4. An emergency control servo system as defined in claim 3 wherein all of said means function to produce digital signals for digital operation of means receiving said digital signals.

5. An emergency control servo system for using thrust modulation for longitudinal control of a multiengine aircraft having a throttle servo for control of all engines in unison, comprising means for independently entering a flightpath angle command to be maintained and producing a flightpath angle command signal γc, means for sensing aircraft longitudinal velocity and producing a lowpass filtered velocity signal, means for subtracting said lowpass filtered velocity signal from said flightpath command signal γc to produce a flightpath error signal γe, means for forming a limited integral as a function of said error signal and means for adding said limited integral to said flightpath error signal γe for producing an output control signal ATC to said throttle servo, thereby to adjust thrust of said engines to reduce said flightpath error signal γe toward zero.

6. An emergency control system of claim 5 wherein said control law is implemented in digital form.

7. An emergency control system of claim 5 wherein said control law is implemented in digital form.

8. An emergency control system for using thrust modulation for longitudinal control of a multiengine aircraft having aircraft dynamic sensors of flight angle γ and aircraft velocity Vel, a flight control computer and a single throttle servo for control of all engines in unison and having means for both independently entering a flightpath angle command to be maintained and producing a flightpath angle command signal γc said emergency system comprising a closed loop servo system for producing a throttle command signal ATC for said throttle servo in accordance with the following control law in the S-plane:

$$ATC=Ksc(Kvi/S*\gamma e*Ke+(\gamma e*Ke-B)Kve)$$

where: Ksc is a constant for proportioning said control output signal of said closed loop servo system to said throttle servo;

γe=γc−γ, and γ is the sensed flightpath angle scaled by a constant Kgma to be proportional to the command input γc in volts per degree;

B=Kvel*$Vel_f$, and $Vel_f$ equals Vel*50/(S+50),

Ke and Kve are scaling constants;

Kvi is a scaling constant for the integral γeKe/S.

9. An emergency control system for using thrust modulation for longitudinal control of all engines in unison and a flight control computer and a single throttle servo for control of all engines in unison, means for sensing aircraft velocity and producing a signal Vel proportionate thereto, and further having means for both independently entering a flightpath angle command to be maintained and producing a flightpath angle signal γc, and said emergency control system comprising a closed loop servo system producing a throttle command signal ATC for said single servo, a throttle command ATC for all engines as a function of velocity feedback in accordance with the following control law in the S-plane:

$$ATC=Ksc*\gamma e(Kvi/S+Kve)$$

where: γe=γc−B,

B=Kvel*$Vel_f$, $Vel_f$=50/(S+50)*Ve,

Ksc is a scaling constant, and

Kvi is a scaling constant.

* * * * *